United States Patent
Inagaki et al.

(10) Patent No.: US 6,629,262 B1
(45) Date of Patent: Sep. 30, 2003

(54) MULTIPLEXED STORAGE CONTROLLING DEVICE

(75) Inventors: Yasuhiro Inagaki, Mishima (JP); Masakazu Kato, Numazu (JP); Katsunori Yamada, Mishima (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 526 days.

(21) Appl. No.: 09/668,863

(22) Filed: Sep. 25, 2000

(30) Foreign Application Priority Data

Sep. 30, 1999 (JP) .............................. 11-279257

(51) Int. Cl.[7] .............................................. H01H 3/05
(52) U.S. Cl. ...................... 714/6; 714/710; 711/103; 711/112; 710/5
(58) Field of Search ........................... 714/6, 7, 8, 36, 714/45, 48, 710; 711/4, 103, 112, 114; 710/5; 365/185.33; 713/321

(56) References Cited

U.S. PATENT DOCUMENTS

| 4,084,234 A | * | 4/1978 | Calle et al. ................. 711/118 |
| 4,168,523 A | * | 9/1979 | Chari et al. ................. 711/220 |
| 4,661,925 A | * | 4/1987 | Maccianti et al. .......... 712/210 |
| 5,210,842 A | * | 5/1993 | Sood ........................... 711/125 |
| 5,559,994 A | * | 9/1996 | Ando .......................... 711/167 |
| 5,572,659 A | | 11/1996 | Iwasa et al. |
| 5,887,128 A | | 3/1999 | Iwasa et al. |
| 6,023,746 A | * | 2/2000 | Arimilli et al. ............. 711/118 |
| 6,438,700 B1 | * | 8/2002 | Adusumilli .................. 713/323 |

FOREIGN PATENT DOCUMENTS

| GB | 2296352 A | * | 6/1996 | ............. G06F/9/32 |
| JP | 9-27162 | | 1/1997 | |
| WO | WO 8605015 A1 | * | 8/1986 | ............. G06F/9/22 |

* cited by examiner

Primary Examiner—Robert Beausoliel
Assistant Examiner—Rita A Ziemer
(74) Attorney, Agent, or Firm—Frishauf, Holtz, Goodman & Chick, P.C.

(57) ABSTRACT

A command from a host computer is held in a command holding section, and commands set in a register are referenced to determine whether or not the held command involves data transfer. If the command involves data transfer, a switching signal output section outputs switching identifying signals SX and SY to a command switching section. Thus, the command involves data transfer, control is provided by a hardware configuration without using a CPU. Alternatively, when the command involves no data transfer, the switching signal output section outputs an interrupt to the CPU. The CPU interprets the command held in the command holding section to output the switching identifying signals SX and SY to the command switching section.

9 Claims, 5 Drawing Sheets

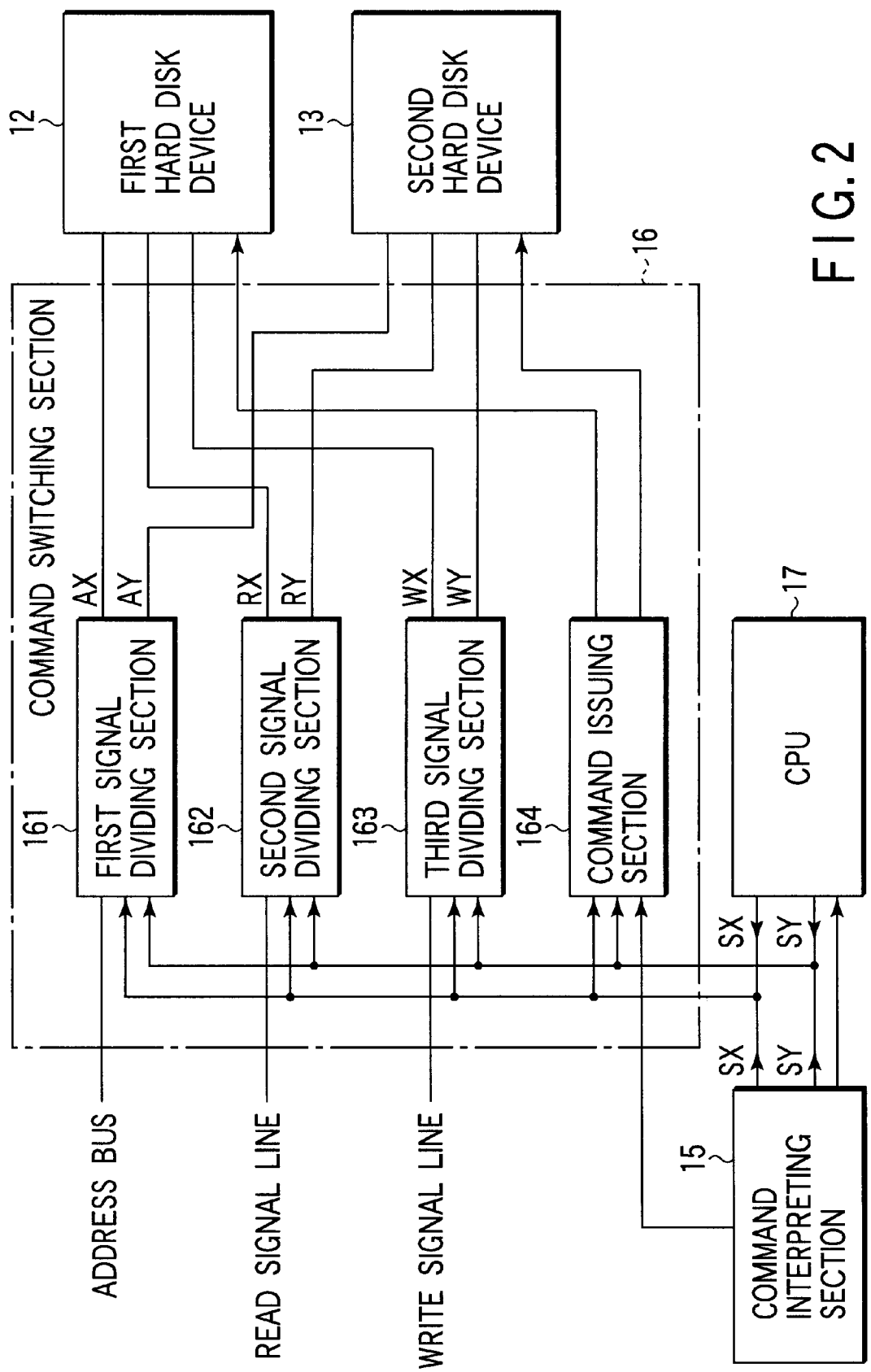
F I G. 2

MULTIPLEXED STORAGE CONTROLLING DEVICE

CROSS-REFERENCE TO RELATED APPLICATIONS

This application is based upon and claims the benefit of priority from the prior Japanese Patent Application No. 11-279257, filed Sep. 30, 1999, the entire contents of which are incorporated herein by reference.

BACKGROUND OF THE INVENTION

The present invention relates to a multiplexed storage controlling device for controlling accesses to a plurality of storage devices that store the same data.

Computer systems are known in which, for example, the hard disk device is used as an external storage device. In such a computer system, to eliminate possible defects from the hard disk device, a plurality of hard disk devices are provided and the same data is stored in these hard disk devices for multiplexing so that even if one of the hard disk devices becomes defective, the data is obtained from another hard disk device and thus protected.

Such a multiplexing system for multiplexing data is known from Jpn. Pat. Appln. KOKAI Publication No. 9-27162. As shown in FIG. 7, this system comprises a host computer 1, two hard disk devices 2 and 3, a central processing unit (hereafter referred to as a "CPU") 4, and a bus controller 5 so that when the host computer 1 outputs a command, the CPU 4 receives and interprets it to determine whether to issue the command to one 2 or the other 3 or both 2 and 3 of the hard disk devices, depending on the type of the command. This determination is made by software for operating the CPU 4.

If, for example, a write command is output from the host computer 1, the CPU 4 interprets this command to issue it to both hard disk devices 2 and 3, and based on this command, the bus controller 5 connects signal lines required to transfer data between the host computer 1 and the two hard disk devices 2 and 3, to the corresponding hard disk devices 2 and 3. The host computer 1 then starts to transfer data between the host computer 1 and the two hard disk devices 2 and 3.

In the multiplexing system configured as described above, the CPU 4 judges all commands from the host computer 1, selects a hard disk device to which the command is to be issued, based on software processing, and issues the command to the selected hard disk device. Based on the issued command, the bus controller 5 connects signal lines required to execute the command between the hard disk devices and the host computer. Further, in addition to commands, the CPU processes an error in the software, the error occurring in the hard disk device receiving the command. Since all the commands from the host computer are judged by the software inside the CPU in the above manner, a large amount of time is disadvantageously required before the command is actually executed. The host computer transmits a read command or a write command each of which requires data transfer, and commands that do not require data transfer, such as those for setting the hard disk devices. After the hard disk device has been activated, if a large amount of time is required before the read and write commands are actually executed, the entire multiplexing system disadvantageously operates at a low speed. In addition, to allow the software inside the CPU to judge all the commands and process errors in a short time, an expensive CPU with a high judgment capability is required, resulting in an expensive multiplexed storage controlling device.

BRIEF SUMMARY OF THE INVENTION

It is an object of the present invention to provide an inexpensive multiplexed storage controlling device that carries out a process for selectively connecting signal lines to each storage device to allow a command requiring data transfer from a host computer to be interpreted and executed without the need to involve a CPU, thereby reducing the amount of processing time required before the command from the host computer is actually executed by a hard disk device, to improve a processing speed of a multiplexing system.

An invention according to claim 1 is characterized by comprising command interpreting means for interpreting a command from a host computer, a command switching means for issuing the command to one or more of a plurality of storage devices that store the same data, and a central processing unit, that command interpreting means comprising a command holding section for holding the command from the host computer, a command determining section for determining whether or not the held command transfers data, and a switching signal output section for outputting, when the command determining section determines that the command involves data transfer, a selection signal for selecting a storage device to which this command is directed, outputting a notification signal to the central processing unit when the command determining section determines that the command involves no data transfer, upon receiving the notification signal, the central processing unit interprets this command involving no data transfer and outputs a selection signal for selecting a storage device to which this command is directed, the command switching means selectively connecting control lines for allowing the command to be executed, to each of the storage devices based on the selection signal from the switching signal output section or the central processing unit, in order to issue the command to the storage device to which the control lines have been connected.

The invention set forth in claim 1 can carry out a process for selectively connecting signal lines to each storage device to allow a command from a host computer to be interpreted and executed without the need to involve a CPU, thereby reducing the amount of processing time required before the command from the host computer is actually executed by a hard disk device. Consequently, an inexpensive multiplexed storage controlling device can be provided which can improve the processing speed of the entire multiplexing system even with an inexpensive CPU.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram showing the configuration of a command switching section according to this embodiment;

DETAILED DESCRIPTION OF THE INVENTION

Embodiments of the present invention will be described with reference to the drawings.

First Embodiment

Figure 1:
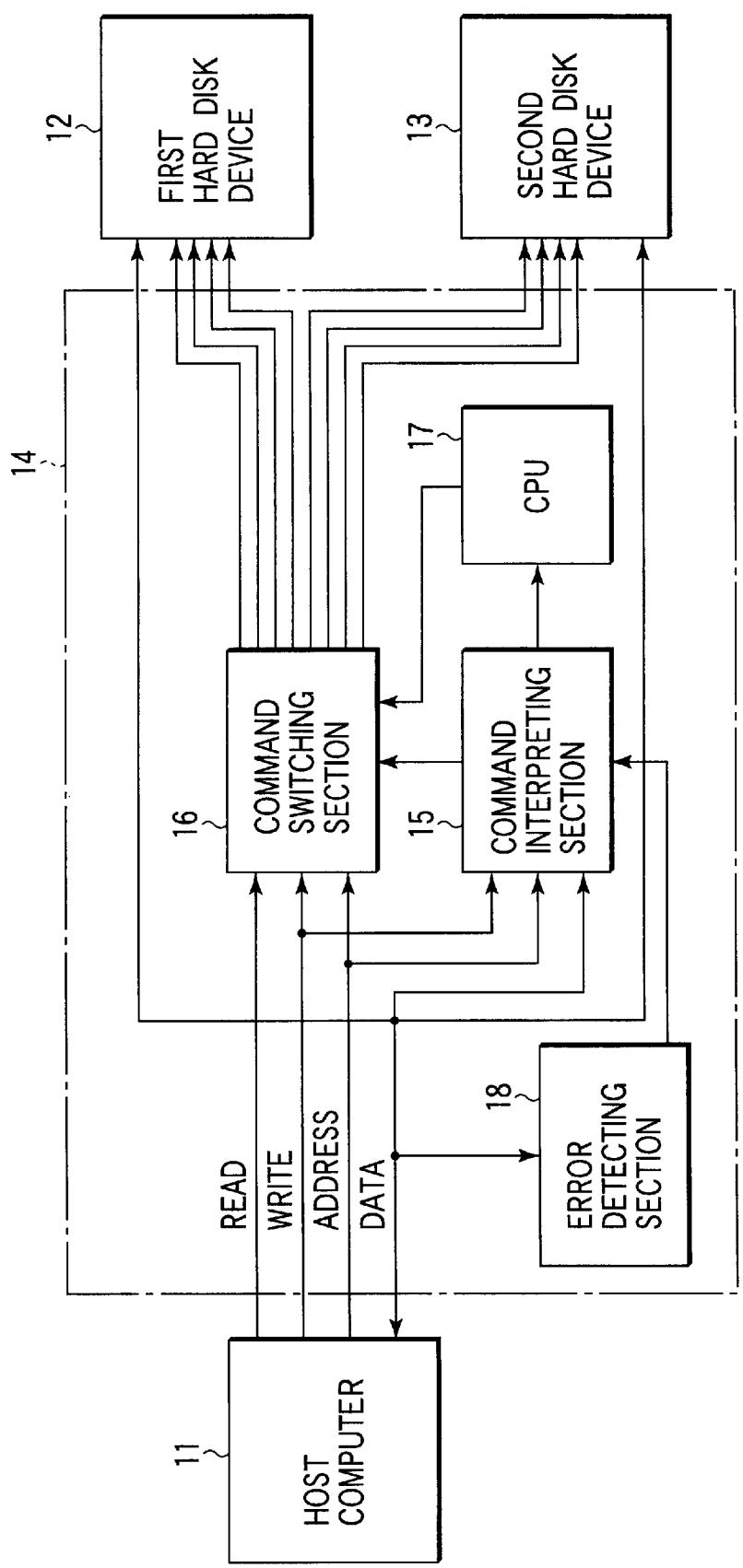
FIG. 1 is a block diagram showing the entire configuration of a multiplexing system according to a first embodiment of the present invention.

FIG. 1 is a block diagram showing the entire configuration of a multiplexing system. Reference numeral 11 denotes a host computer, reference numeral 12 denotes a first hard disk device acting as a storage device, reference numeral 13 denotes a second hard disk device acting as a storage device, and reference numeral 14 denotes a multiplexed storage controlling device constituting an integral part.

The multiplexed storage controlling device 14 is formed of a command interpreting section 15 constituting command interpreting means for interpreting a command from the host computer 11, a command switching section 16 constituting command switching means for issuing the command to one or both of the hard disk devices 12 and 13, which store the same command, a CPU (a central processing unit) 17, and an error detecting section 18 constituting error detecting means for detecting an error in each of the hard disk devices 12 and 13.

The host computer 11 and the command interpreting section 15 are connected together via a write signal line, an address bus line, and a data bus line, the host computer 11 and the command switching section 16 are connected together via a read signal line, the write signal line, and the address bus line, and the host computer 11 and each of the hard disk devices 12 and 13 are connected together via a data bus line. In addition, the error detecting section 18 is connected to the data bus line.

As shown in FIG. 2, the command switching section 16 is composed of a first signal dividing section 161 for carrying out a control that branches the address bus line from the host computer 1 and selectively connects branched address bus lines AX and AY to one or both of the hard disk devices 12 and 13, a second signal dividing section 162 for carrying out a control that branches the read signal line from the host computer 1 and selectively connects branched read signal lines RX and RY to one or both of the hard disk devices 12 and 13, a third signal dividing section 163 for carrying out a control that branches the write signal line from the host computer 1 and selectively connects branched write signal lines WX and WY to one or both of the hard disk devices 12 and 13, and a command issuing section 164 for selectively issuing the command held by the command interpreting section 15 to one or both of the hard disk devices 12 and 13.

Figure 3:
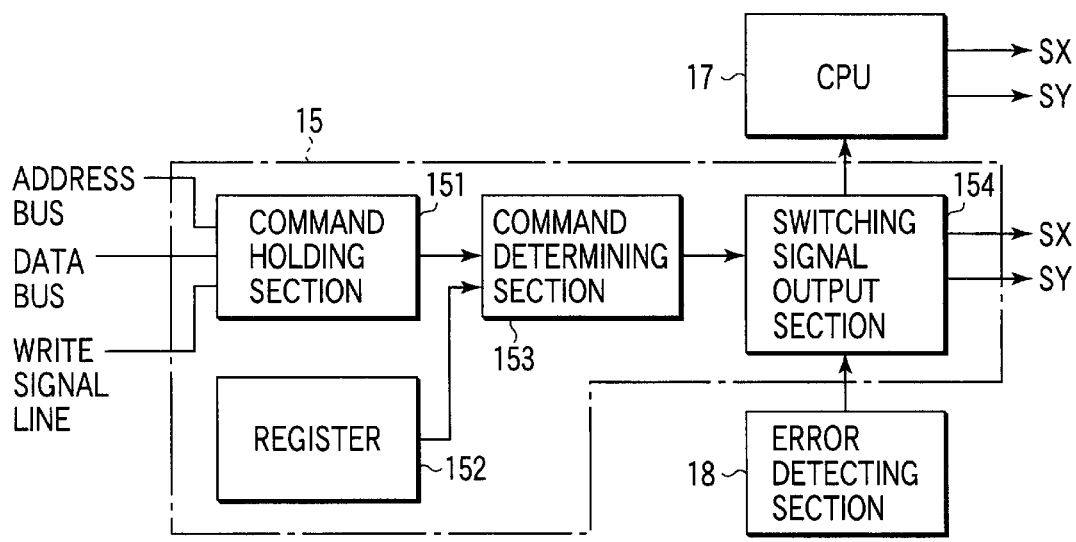
FIG. 3 is a block diagram showing the configuration of a command interpreting section according to this embodiment.

As shown in FIG. 3, the command interpreting section 15 is composed of a command holding section 151 for holding command input via the address bus line, the data bus line, and the write signal line from the host computer 11, a register 152 constituting a command setting section that sets beforehand command representing a command for writing data and a command for writing data, as commands involving data transfer, a determination section 153 for comparing the commands set in the register 152 with the command code held in the command holding section 151 to determine whether the command reads or writes data, and a switching signal output section 154 for determining from a result of the determination by the command determining section 153 and a result obtained by the error detecting section 18 whether to output switching identifying signals SX and SY to each of the signal dividing sections 161, 162, and 163 of the command switching section 16 or to output an interrupt signal to the CPU 17. Each section comprises hardware comprising a logic circuit.

Upon receiving the interrupt signal from the switching signal output section 154, the CPU 17 interprets the command held in the command holding section 151 of the command interpreting section 15 to output the switching identifying signals SX and SY to each of the signal dividing sections 161, 162, and 163 of the command switching section 16.

Figure 4:
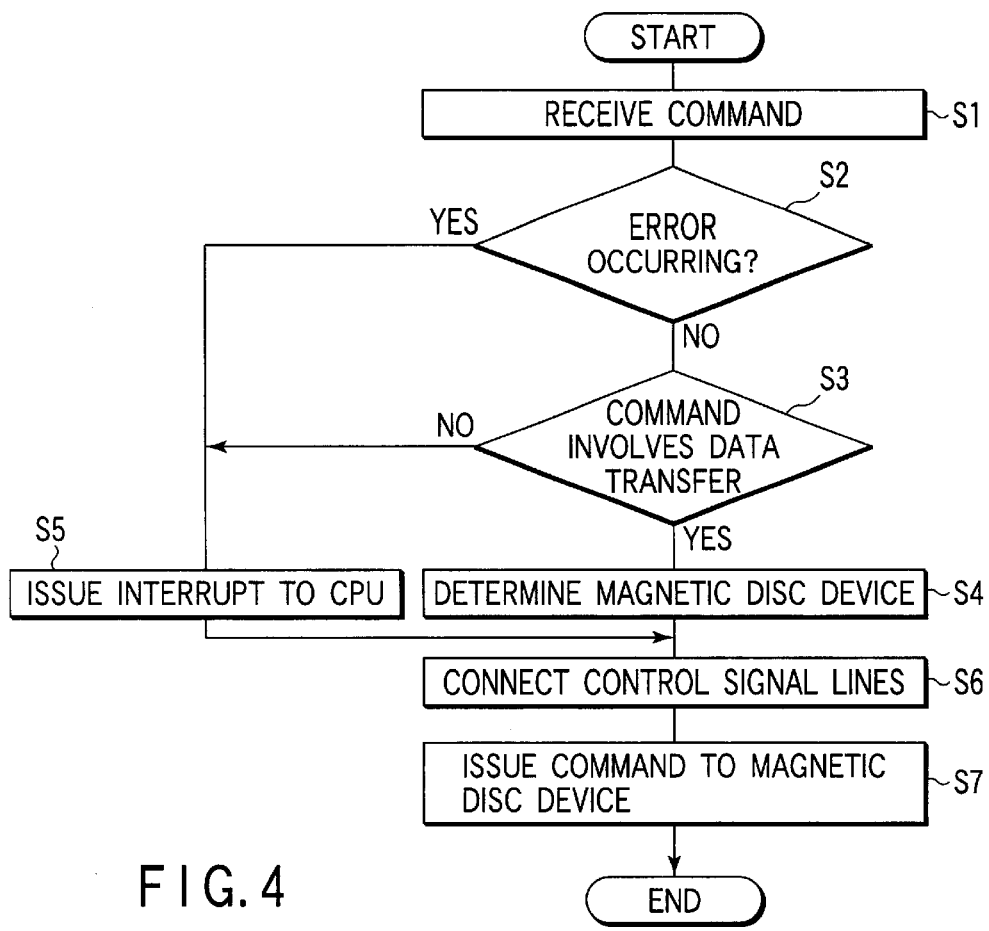
FIG. 4 is a flow chart useful in explaining an operation according to this embodiment.

FIG. 4 is a flow chart showing a flow of an operation performed by the multiplexed storage controlling device 14. While the error detecting section 18 is detecting no error in the hard disk devices, when a command is first received from the host computer 11 via the address bus line, the data bus line, and the write signal line at S1, the command interpreting section 15 holds the received command in the command holding section 151.

At S3, the command determining section 153 references the commands set in the register 152 to determine whether or not the held command involves data transfer and if so, further determine whether the command reads or writes data from or to the hard disk device.

If the command is determined to involve data transfer and read data from the hard disk device, then at S4, the command interpreting section 15 sets the switching identifying signals SX and SY output from the switching signal output section 154 by, for example, turning on the SX while turning off the SY to read data only from the first hard disk device 12.

In this case, the switching signal output section 154 is composed of a logical circuit such that the SX is turned on while the SY is turned off when the determination section determines that the command reads data. The switching signals SX and SY output from the switching signal output section 154 may also be set in such a manner that the SX is turned off while the SY is turned on to read data only from the second hard disk device 13. In this case, the switching signal output section 154 is composed of a logical circuit such that the SX is turned off while the SY is turned on when the determination section determines that the command reads data. In this manner, it can be fixed to which hard disk device the command for reading data or the command for writing data is to be issued, so that the switching signal output section 154 can fixedly output the switching identifying signals SX and SY.

Thus, at S6, the first signal dividing section 161 of the command switching section 16 receives the switching identifying signals SX and SY to connect the address bus line AX to the first hard disk device 12. Additionally, the second signal dividing section 162 receives the switching identifying signals SX and SY to connect the read signal line RX to the first hard disk device 12. Further, the third signal dividing section 163 receives the switching identifying signals SX and SY to connect the write signal line WX to the first hard disk device 12.

At S7, the command issuing section 164 of the command switching section 16 issues the command held in the command holding section 151 of the command interpreting section 15 to the first hard disk device 12.

Thus, the host computer 11 supplies the first hard disk device 12 with the address signal via the address line and with the read signal via the read signal line. The first hard disk device 12 executes the read command from the command issuing section 164 and transmits read data to the host computer 11 via the data bus line.

Alternatively, if the command is determined at S3 to involve data transfer and write data to the hard disk device, the command interpreting section 15 turns on both switching identifying signals SX and SY at S4 to write data to both hard disk devices 12 and 13. The switching signal output section 154 is composed of a logical circuit such that both SX and SY are turned on when the determination section determines that the command writes data.

Then, at S6, the first signal dividing section 161 of the command switching section 16 receives the switching identifying signals SX and SY to connect the address bus line AX to the first hard disk device 12 while connecting the address bus line AY to the second hard disk device 13. Additionally, the second signal dividing section 162 receives the switching identifying signals SX and SY to connect the read signal line RX to the first hard disk device 12 while connecting the read signal line RY to the second hard disk device 13. Further, the third signal dividing section 163 receives the switching identifying signals SX and SY to connect the write signal line WX to the first hard disk device 12 while connecting the write signal line WY to the second hard disk device 13.

Then, at S7, the command issuing section 164 of the command switching section 16 issues the command held in the command holding section 151 of the command interpreting section 15, to both first and second hard disk devices 12 and 13.

In this manner, the host computer 11 supplies each of the first and second hard disk devices 12 and 13 with the address signal via the address line and with the write signal via the write signal line. Each of the first and second hard disk devices 12 and 13 executes the write command from the command issuing section 164 to write thereto data transmitted from the host computer via the data bus line.

Alternatively, if the command is determined to involve no data transfer at S3, the switching signal output section 154 generates an interrupt signal to the CPU 17. The switching signal output section 154 is composed of a logical circuit such that the interrupt signal is output if the determination section determines that the command neither writes or reads data. Upon receiving the interrupt, the CPU 17 interprets the command held in the command holding section 151 of the command interpreting section 15 and turns on both switching identifying signals SX and SY if, for example, the command generates commands to all the hard disk devices 12 and 13.

Then, at S6, the first signal dividing section 161 of the command switching section 16 receives the switching identifying signals SX and SY to connect the address bus line AX to the first hard disk device 12 while connecting the address bus line AY to the second hard disk device 13. Additionally, the second signal dividing section 162 receives the switching identifying signals SX and SY to connect the read signal line RX to the first hard disk device 12 while connecting the read signal line RY to the second hard disk device 13. Further, the third signal dividing section 163 receives the switching identifying signals SX and SY to connect the write signal line WX to the first hard disk device 12 while connecting the write signal line WY to the second hard disk device 13.

Then, at S7, the command issuing section 164 of the command switching section 16 issues the command held in the command holding section 151 of the command interpreting section 15, to both first and second hard disk devices 12 and 13.

In this manner, the hard disk device 12 and 13 each execute the command and return a reply to the host computer 11 in accordance with the address signal on the address bus line, the read signal on the read signal line, and the write signal on the write signal line.

Next, a case where an error occurs in the hard disk device will be described.

If, for example, an error occurs in the first hard disk device 12, the error detecting section 18 detects it and notifies the switching signal output section 154 of it. Then, when a command is received from the host computer 11 via the address bus line, the data bus line, and the write signal line at S1, the command interpreting section 15 holds the received command in the command holding section 151.

Since it has been indicated by the error detecting section 18 that an error is occurring in the first hard disk device 12, the switching signal output section 154 of the command interpreting section 15 determines that the error is occurring at S2 and generates an interrupt to the CPU 17 irrespective of a result of determination by the command determining section 153. Upon receiving the interrupt, the CPU 17 processes the error to produce the switching identifying signals SX and SY. Since the error processing depends on the contents of the error, the CPU 17 executes this processing. In this case, the error is occurring in the first hard disk device 12, so that the CPU 17 turns off the SX while turning on the SY.

Then, at S6, the first signal dividing section 161 of the command switching section 16 receives the switching identifying signals SX and SY to connect the address bus line AY to the second hard disk device 13. Additionally, the second signal dividing section 162 receives the switching identifying signals SX and SY to connect the read signal line RY to the second hard disk device 13. Further, the third signal dividing section 163 receives the switching identifying signals SX and SY to connect the write signal line WY to the second hard disk device 13.

Then, at S7, the command issuing section 164 of the command switching section 16 issues the command held in the command holding section 151 of the command interpreting section 15, to the second hard disk devices 13. For example, a command for reading data from the hard disk device is supplied to the second hard disk device 13.

Then, the second hard disk device 13 executes the read command in accordance with the address signal on the address bus line, the read signal on the read signal line, and the write signal on the write signal line, and transmits the read data to the host computer 11 via the data bus line.

As described above, the multiplied storage controlling device 14 controls the connections of the address line, lead signal line, and write signal line to the hard disk device via the CPU 17 when a command without data transfer is received from the host computer 18 and when the error detecting section 18 detects an error in the hard disk device. When a command for data transfer is received from the host computer 11, the hardware configuration alone can execute this command without using the CPU 17. That is, for the write or read command, which is often output from the host computer, the signal lines can be selectively connected to each storage device to interpret and execute the command without the need to involve the CPU. This serves to reduce the processing time required before the hard disk device can actually execute the write or read command, which is often send from the host computer. Since the CPU interprets only those of the commands from the host computer which do not involve data transfer, the processing speed of the entire multiplexing system can be improved even with an inexpensive CPU. Further, an error in the hard disk device is processed by the CPU, thereby improving reliability of the multiplexed storage control device.

Second Embodiment

According to the second embodiment, for not only the commands for data transfer but also the commands without data transfer, the hardware configuration alone can control the connections of the address line, read signal line, and write signal line to the hard disk device without need to involve the CPU 17.

Figure 5:
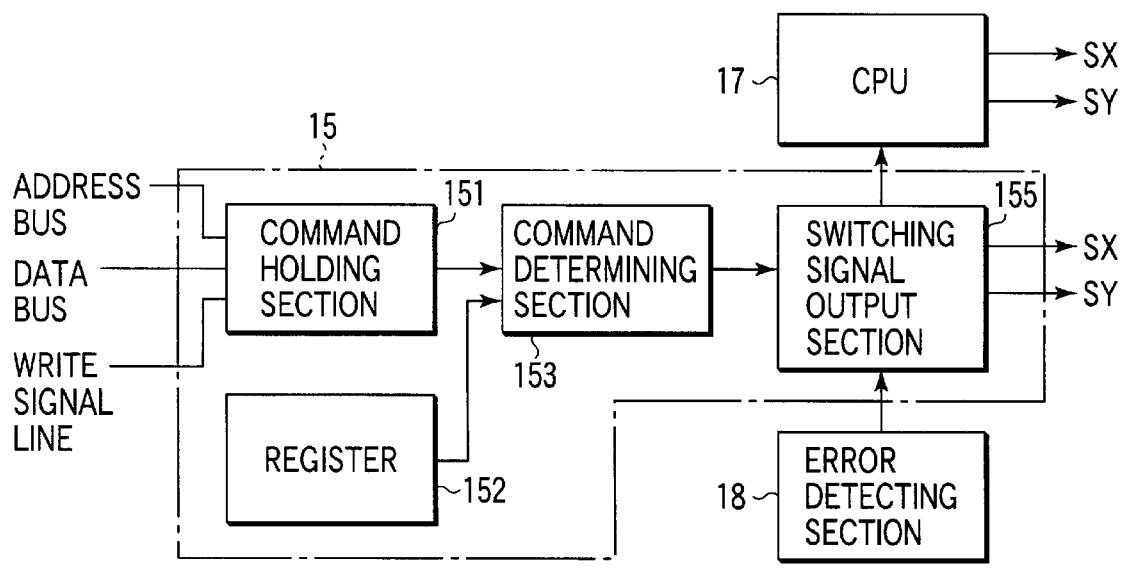
FIG. 5 is a block diagram showing the configuration of a command interpreting section according to a second embodiment of the present invention.

FIG. 5 shows the configuration of the command interpreting section 16. The switching signal output section 155 generates an interrupt to the CPU 17 only when the error detecting section 18 detects an error in the hard disk device, and supplies the switching identifying signals SX and SY to the command switching section 16 when the command involves or does not involve data transfer. The other parts of the configuration are the same as in the above described first embodiment.

Figure 6:
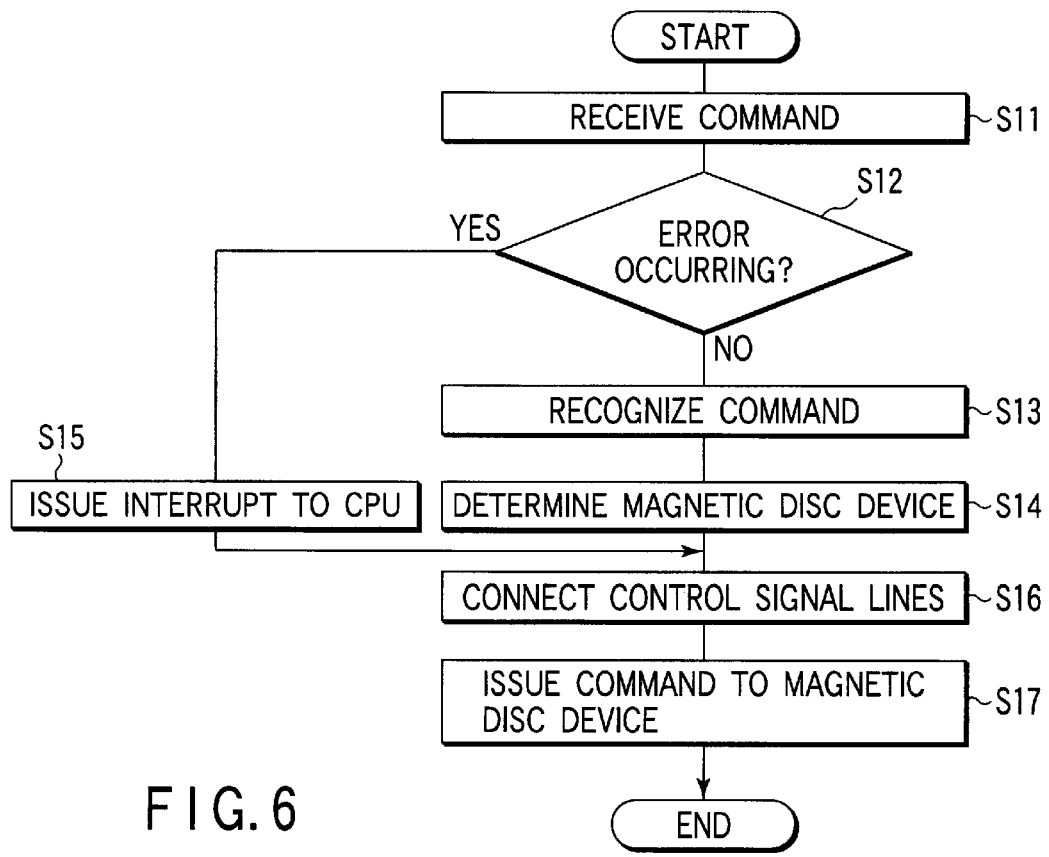
FIG. 6 is a flow chart useful in explaining an operation according to this embodiment.
Figure 7:
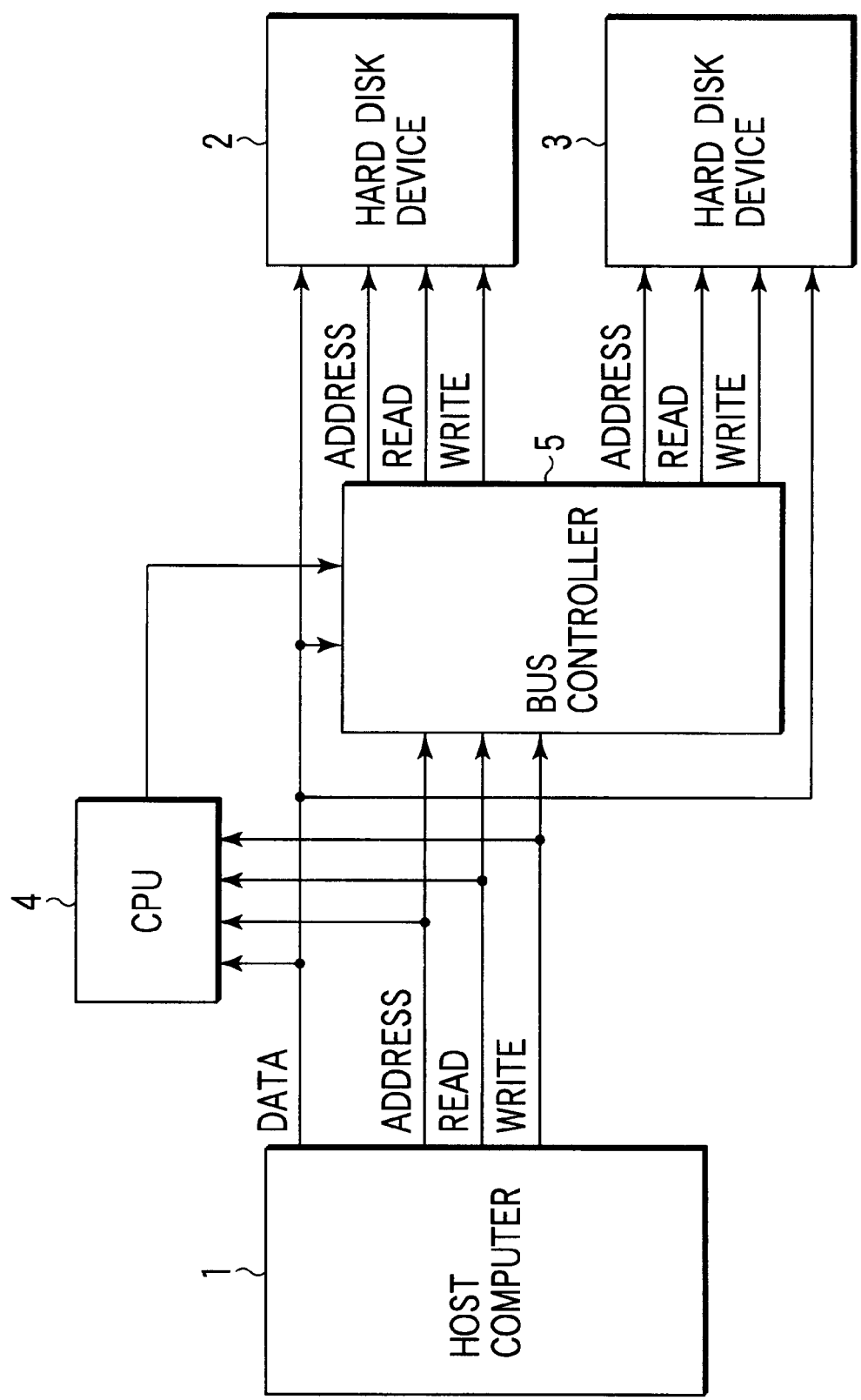
FIG. 7 is a block diagram showing a conventional example.

The operation of multiplexed storage controlling device 14 is shown in FIG. 6; while the error detecting section 18 is detecting no error in the hard disk devices, when a command is first received from the host computer 11 via the address bus line, the data bus line, and the write signal line at S11, the command interpreting section 15 holds the received command in the command holding section 151.

Then, at S13, the command determining section 153 references the commands set in the register 152 to determine whether or not the held command involves data transfer and if so, further determine whether the command reads or writes data from or to the hard disk device.

If the command is determined to involve data transfer and read data from the hard disk device, then at S14, the switching signal output section 155 of the command interpreting section 15 sets the output switching identifying signals SX and SY by, for example, turning on the SX while turning off the SY to read data only from the first hard disk device 12.

Then, at S16, the first signal dividing section 161 of the command switching section 16 receives the switching identifying signals SX and SY to connect the address bus line AX to the first hard disk device 12. Additionally, the second signal dividing section 162 receives the switching identifying signals SX and SY to connect the read signal line RX to the first hard disk device 12. Further, the third signal dividing section 163 receives the switching identifying signals SX and SY to connect the write signal line WX to the first hard disk device 12.

At S17, the command issuing section 164 of the command switching section 16 issues the command held in the command holding section 151 of the command interpreting section 15 to the first hard disk device 12.

Thus, the host computer 11 supplies the first hard disk device 12 with the address signal via the address line and with the read signal via the read signal line. The first hard disk device 12 executes the read command from the command issuing section 164 and transmits read data to the host computer 11 via the data bus line.

Alternatively, if the command is determined at S13 to involve data transfer and write data to the hard disk device, the switching signal output section 155 of the command interpreting section 15 turns on both switching identifying signals SX and SY at S4 to write data to both hard disk devices 12 and 13.

Then, at S6, the first signal dividing section 161 of the command switching section 16 receives the switching identifying signals SX and SY to connect the address bus line AX to the first hard disk device 12 while connecting the address bus line AY to the second hard disk device 13. Additionally, the second signal dividing section 162 receives the switching identifying signals SX and SY to connect the read signal line RX to the first hard disk device 12 while connecting the read signal line RY to the second hard disk device 13. Further, the third signal dividing section 163 receives the switching identifying signals SX and SY to connect the write signal line WX to the first hard disk device 12 while connecting the write signal line WY to the second hard disk device 13.

Then, at S17, the command issuing section 164 of the command switching section 16 issues the command held in the command holding section 151 of the command interpreting section 15, to both first and second hard disk devices 12 and 13.

Thus, the host computer 11 supplies each of the first and second hard disk device 12 and 13 with the address signal via the address line and with the read signal via the read signal line. Each of the first and second hard disk devices 12 and 13 executes the write command from the command issuing section 164 and transmits write data from the host computer 11 via the data bus line.

Alternatively, if the command is determined to involve no data transfer at S13, the switching signal output section 155 turns on both switching identifying signals SX and SY to issue the command to both hard disk devices 12 and 13. The switching signal output section 154 is composed of a logical circuit such that both SX and SY are turned on if the determination section determines that the command neither writes or reads data. The commands not involving data transfer include those for setting the hard disk device, for example, one for setting a data transfer mode, and may all be issued to the hard disk devices.

Then, at S16, the first signal dividing section 161 of the command switching section 16 receives the switching identifying signals SX and SY to connect the address bus line AX to the first hard disk device 12 while connecting the address bus line AY to the second hard disk device 13. Additionally, the second signal dividing section 162 receives the switching identifying signals SX and SY to connect the read signal line RX to the first hard disk device 12 while connecting the read signal line RY to the second hard disk device 13. Further, the third signal dividing section 163 receives the switching identifying signals SX and SY to connect the write signal line WX to the first hard disk device 12 while connecting the write signal line WY to the second hard disk device 13.

Then, at S17, the command issuing section 164 of the command switching section 16 issues the command held in the command holding section 151 of the command interpreting section 15, to both first and second hard disk devices 12 and 13.

In this manner, the hard disk device 12 and 13 each execute the command and return a reply to the host computer 11 in accordance with the address signal on the address bus line, the read signal on the read signal line, and the write signal on the write signal line. If, for example, the command sets a rate at which data is transferred to the hard disk devices 12 and 13, the hard disk devices 12 and 13 each set the data transfer speed and returns a reply indicating results of the setting or the like to the host computer 11 via the data bus line in accordance with the address signal on the address bus line and the read signal on the read signal line.

Next, a case where an error occurs in the hard disk device will be described.

If, for example, an error occurs in the first hard disk device 12, the error detecting section 18 detects it and notifies the switching signal output section 154 of it. Then, when a command is received from the host computer 11 via the address bus line, the data bus line, and the write signal line at S11, the command interpreting section 15 holds the received command in the command holding section 151.

Since it has been indicated by the error detecting section 18 that an error is occurring in the first hard disk device 12, the switching signal output section 155 of the command interpreting section 15 determines at S12 that the error is occurring and generates an interrupt to the CPU 17 irrespective of a result of determination by the command determining section 153. Upon receiving the interrupt, the CPU 17 processes the error to produce the switching identifying signals SX and SY. That is, the error is occurring in the first hard disk device 12, so that the CPU 17 turns off the SX while turning on the SY.

Then, at S16, the first signal dividing section 161 of the command switching section 16 receives the switching identifying signals SX and SY to connect the address bus line AY to the second hard disk device 13. Additionally, the second signal dividing section 162 receives the switching identifying signals SX and SY to connect the read signal line RY to the second hard disk device 13. Further, the third signal dividing section 163 receives the switching identifying signals SX and SY to connect the write signal line WY to the second hard disk device 13.

Then, at S17, the command issuing section 164 of the command switching section 16 issues the command held in the command holding section 151 of the command interpreting section 15, to the second hard disk devices 13. For example, a command for reading data from the hard disk device is supplied to the second hard disk device 13.

Then, the second hard disk device 13 executes the write command in accordance with the address signal on the address bus line, the read signal on the read signal line, and the write signal on the write signal line, and transmits the read data to the host computer 11 via the data bus line.

As described above, the multiplied storage controlling device 14 controls the connections of the address line, read signal line, and write signal line to the hard disk device via the CPU 17 only when the error detecting section 18 detects an error in the hard disk device. When a command for data transfer or a command without data transfer is received from the host computer 11, the hardware configuration alone can execute this command without using the CPU 17. That is, the signal lines can be selectively connected to each storage device to interpret and execute the command without the need to involve the CPU. This serves to reduce the processing time required before the hard device can actually execute the command. Since the CPU processes only errors in the hard disk device, the processing speed of the entire multiplexing system can be improved using an inexpensive CPU. The reliability of the multiplexed storage control device can also be improved.

In each of the above described embodiments, two hard disk devices are used as a storage device, the present invention can also be implemented when three or more hard disk devices are used. Furthermore, in each embodiment, the hard disk device is taken as an example of the storage device, but the present invention is not limited to this. The storage device may be a hard disk device, an optical disk device, or a hard tape device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multiplexed storage controlling device comprising:

command interpreting means for interpreting a command from a host computer;

a command switching means for issuing the command to one or more of a plurality of storage devices that store the same data; and a central processing unit:

wherein said command interpreting means comprising a command holding section for holding the command from said host computer, a command determining section for determining whether or not the held command involves data transfer, and a switching signal output section for outputting, when the command determining section determines that the command involves data transfer, a selection signal for selecting a storage device to which this command is directed, outputting a notification signal to said central processing unit when said command determining section determines that the command involves no data transfer, upon receiving the notification signal, said central processing unit interprets this command involving no data transfer and outputs a selection signal for selecting a storage device to which this command is directed, said command switching means selectively connecting control lines for allowing the command to be executed, to each of said storage devices based on the selection signal from said switching signal output section or said central processing unit, in order to issue the command to the storage device to which the control lines have been connected.

2. A multiplied storage controlling device according to claim 1, wherein the command interpreting means further comprises a command setting section for setting said command involving data transfer, said command determining section compares the command held in the command holding section with the command set by said command setting section to determine whether or not the command involves data transfer.

3. A multiplied storage controlling device according to claim 1,
- wherein said control lines are an address bus line, a read signal line, and a write signal line,
- said host computer and the plurality of storage devices are connected together via data bus lines, said host computer and said command switching means are connected together via the read signal line, the write signal line, and the address bus line, said host computer and the command interpreting means are connected together via the write signal line, the address bus line, and the data bus line.

4. A multiplexed storage device comprising:
- command interpreting means for interpreting a command from a host computer;
- a command switching means for issuing the command to one or more of a plurality of storage devices that store the same data;
- a central processing unit; and
- error detecting means for detecting an error in each of said storage devices,
  - wherein said command interpreting means comprising a command holding section for holding the command from said host computer, a command determining section for determining whether or not the held command involves data transfer, and a switching signal output section for outputting, when the command determining section determines that the command involves data transfer, a selection signal for selecting a storage device to which this command is directed, outputting a notification signal to said central processing unit when said command determining section determines that the command involves no data transfer, and generating a notification signal to said central processing unit when said error detecting means detects an error,
  - upon receiving the notification signal resulting from said command involving no data transfer, said central processing unit interprets this command involving no data transfer and outputs a selection signal for selecting a storage device to which this command is directed, and upon receiving said notification signal resulting from the error detection, said central processing unit outputs a selection signal for selecting a storage device with no error occurring therein,
  - said command switching means selectively connecting control lines for allowing the command to be executed, to each of said storage devices based on the selection signal from said switching signal output section or said central processing unit, in order to issue the command to the storage device to which the control lines have been connected.

5. A multiplied storage controlling device according to claim 4,
- wherein the command interpreting means further comprises a command setting section for setting said command involving data transfer,
- said command determining section compares the command held in the command holding section with the command set by said command setting section to determine whether or not the command involves data transfer.

6. A multiplied storage controlling device according to claim 4,
- wherein said control lines are an address bus line, a read signal line, and a write signal line,
- said host computer and the plurality of storage devices are connected together via data bus lines, said host computer and said command switching means are connected together via the read signal line, the write signal line, and the address bus line, said host computer and the command interpreting means are connected together via the write signal line, the address bus line, and the data bus line.

7. A multiplexed storage device comprising:
- command interpreting means for interpreting a command from a host computer;
- a command switching means for issuing the command to one or more of a plurality of storage devices that store the same data;
- a central processing unit; and
- error detecting means for detecting an error in each of said storage devices,
  - wherein said command interpreting means comprising a command holding section for holding the command from said host computer, a command determining section for determining whether or not the held command involves data transfer, and a switching signal output section for outputting, when the command determining section determines that the command involves data transfer, a selection signal for selecting a storage device to which this command is directed, outputting a selection signal for selecting all of said storage devices when said command determining section determines that the command involves no data transfer, and generating a notification signal to said central processing unit when said error detecting means detects an error,
  - upon receiving said notification signal resulting from the error detection, said central processing unit outputs a selection signal for selecting a storage device with no error occurring therein,
  - said command switching means selectively connecting control lines for allowing the command to be executed, to each of said storage devices based on the selection signal from said switching signal output section or said central processing unit, in order to issue the command to the storage device to which the control lines have been connected.

8. A multiplied storage controlling device according to claim 7,
- wherein the command interpreting means further comprises a command setting section for setting said command involving data transfer,
- said command determining section compares the command held in the command holding section with the command set by said command setting section to determine whether or not the command involves data transfer.

9. A multiplied storage controlling device according to claim 7,
- wherein said control lines are an address bus line, a read signal line, and a write signal line,
- said host computer and the plurality of storage devices are connected together via data bus lines, said host computer and said command switching means are connected together via the read signal line, the write signal line, and the address bus line, said host computer and the command interpreting means are connected together via the write signal line, the address bus line, and the data bus line.

* * * * *